United States Patent
Imai (10) Patent No.: US 7,876,702 B2
(45) Date of Patent: Jan. 25, 2011

(54) COMPUTER PROGRAM PRODUCT, APPARATUS AND METHOD FOR MONITORING NETWORK AND REGULATING PACKETS ON A NETWORK PATH

(75) Inventor: Satoshi Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 147 days.

(21) Appl. No.: 12/189,936

(22) Filed: Aug. 12, 2008

(65) Prior Publication Data

US 2009/0257352 A1    Oct. 15, 2009

(30) Foreign Application Priority Data

Apr. 10, 2008    (JP) .............................. 2008-102722

(51) Int. Cl.
*G01R 31/08*    (2006.01)
(52) U.S. Cl. ..................................... 370/252
(58) Field of Classification Search ................ 370/232, 370/241, 252, 254, 389, 392, 229, 230, 235
See application file for complete search history.

(56) References Cited

U.S. PATENT DOCUMENTS

| | | | | |
|---|---|---|---|---|
| 6,920,112 | B1 * | 7/2005 | McCloghrie et al. | ......... 370/252 |
| 7,346,403 | B2 | 3/2008 | Tanaka et al. | |
| 2006/0150029 | A1 * | 7/2006 | Nakamura et al. | ............ 714/39 |
| 2007/0041331 | A1 * | 2/2007 | Ma et al. | .................... 370/252 |
| 2007/0293957 | A1 | 12/2007 | Tanaka et al. | |
| 2009/0116402 | A1 | 5/2009 | Yamasaki | |

FOREIGN PATENT DOCUMENTS

| | | |
|---|---|---|
| JP | 2005-063222 | 3/2005 |
| JP | 2005-070940 A | 3/2005 |
| JP | 2005-286684 | 10/2005 |
| JP | 2006-127079 A | 5/2006 |
| JP | A 2007-74385 | 3/2007 |
| JP | 2009-077136 | 4/2009 |
| JP | 2009-231890 | 10/2009 |
| WO | WO 2006/043624 A1 | 4/2006 |

OTHER PUBLICATIONS

IEICE Technical Report, vol. 107, No. 261, Oct. 11, 2007.
Kobayashi et al.; NS2006-233; "Development of Selective sFlow Router and Study on Traffic Analysis Method"; IEICE Technical Report, Mar. 1, 2007, vol. 106, No. 577, p. 391-396.
"Japanese Office Action", mailed by JPO and corresponding to Japanese application No. 2008-102722 on Aug. 3, 2010, with English translation.

* cited by examiner

*Primary Examiner*—Kwang B Yao
*Assistant Examiner*—Anh Ngoc Nguyen
(74) *Attorney, Agent, or Firm*—Fujitsu Patent Center (57) ABSTRACT

A network monitoring apparatus retrieves packets flowing on a path to be monitored on a network using a packet capturing unit. A packet analyzing unit analyzes the retrieved packets. Although the network monitoring apparatus discards some of the packets using a sampling unit, a sampling rate is determined by a sampling-rate regulating unit. A resource-usage-amount measuring unit measures how many resources are actually used inside the network monitoring apparatus and the sampling rate determined by the sampling-rate regulating unit is based on a resource usage amount.

6 Claims, 7 Drawing Sheets

TARGET VALUE=80%

PARAMETERS INSIDE
STABILITY DOMAIN

FIG.5B

TARGET VALUE=80%

PARAMETERS OUTSIDE
STABILITY DOMAIN

FIG.6A

PARAMETER A INSIDE
STABILITY DOMAIN

FIG.6B

PARAMETER B INSIDE
STABILITY DOMAIN

FIG.7A

STABILITY DOMAIN

FIG.7B

PARAMETER SET A

COMPUTER PROGRAM PRODUCT, APPARATUS AND METHOD FOR MONITORING NETWORK AND REGULATING PACKETS ON A NETWORK PATH

BACKGROUND OF THE INVENTION

1. Field of the Invention

The present invention relates to a network monitoring apparatus that monitors packets flowing on a path, a network monitoring program executed on a computer that functions as the network monitoring apparatus, and a network monitoring method implemented in the network monitoring apparatus.

2. Description of the Related Art

Conventionally, packets flowing on a network are analyzed for detecting illegal content transmission and for blocking the spread of damage due to computer virus infection.

Specifically, a network monitoring apparatus, which performs a packet analysis, is connected to a distribution line branching from a main line to be monitored. The network monitoring apparatus retrieves the same packets as the packets flowing on the main line. The packet analysis is sometimes performed by a relay device such as a router, which is connected to the main line.

In such a network monitoring apparatus, a sampling rate, which is the rate of packets to be analyzed among the packets flowing on the main line, is set.

For example, if the sampling rate is set to 100%, the network monitoring apparatus performs the packet analysis for all the packets flowing on the main line.

For example, if the sampling rate is set to a value less than 100%, for example, to 80%, the network monitoring apparatus performs the packet analysis for 80% of the packets flowing on the main line.

In a method disclosed in Japanese Patent Application Laid-open No. 2007-74385, a table is already prepared in which a delivery data related to packet transmission and reception and the sampling rates corresponding to the delivery data are maintained in an associated form, and the sampling rates are dynamically switched over based on the packet delivery data.

However, in the conditions mentioned above, resources inside the network monitoring apparatus are not maximally utilized within a usable range.

In other words, if the sampling rate is set to 100%, the network monitoring apparatus further retrieves the packets even when the resources are exhausted due to a packet analysis process. Consequently, the resources are overused, thus delaying the packet analysis process.

Further, if the sampling rate is set to a value less than 100%, even though the packet analysis is performed for all the packets flowing on the main line and the resources are still available, the network monitoring apparatus retrieves some of the packets only. Consequently, the resources are underused, thus reducing an accuracy of packet analysis results.

Based on the method disclosed earlier, even though the sampling rates are dynamically switched over, the problems as mentioned earlier are likely to occur.

SUMMARY

It is an object of the present invention to at least partially solve the problems in the conventional technology.

According to an aspect of the present invention, a computer program product has a computer readable medium including programmed instructions. The instructions include retrieving packets flowing on a path to be monitored on a network; analyzing the packets retrieved at the retrieving; measuring a usage amount of resources that are actually used by the network monitoring apparatus; and regulating, upon measurement results at the measuring exceeding predetermined threshold values, a sampling rate indicating a percentage of the packets on the path that are analyzed at the analyzing such that the measurement results at the measuring approach predetermined target values.

According to another aspect of the present invention, a method for monitoring a network in a network monitoring apparatus connected the network includes retrieving packets flowing on a path to be monitored on the network; analyzing the packets retrieved at the retrieving; measuring a usage amount of resources that are actually used by the network monitoring apparatus; and regulating, upon measurement results at the measuring exceeding predetermined threshold values, a sampling rate indicating a percentage of the packets on the path that are analyzed at the analyzing such that the measurement results at the measuring approach predetermined target values.

According to still another aspect of the present invention, a network monitoring apparatus includes a packet retrieving unit that retrieves packets flowing on a path to be monitored on a network; a packet analyzing unit that analyzes the packets retrieved by the packet retrieving unit; a resource-usage-amount measuring unit that measures a usage amount of resources that are actually used by the network monitoring apparatus; and a sampling-rate regulating that regulates, upon measurement results by the resource-usage-amount measuring unit exceeding predetermined threshold values, a sampling rate indicating a percentage of the packets on the path that are analyzed by the packet analyzing unit such that the measurement results by the resource-usage-amount measuring unit approach predetermined target values.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a network monitoring apparatus according to the present invention are explained below in detail with reference to the accompanying drawings.

An outline of the network monitoring apparatus is explained first. To retrieve packets flowing on a path to be monitored, the network monitoring apparatus is installed by connecting to a distribution line that is branched from a main line.

Further, the network monitoring apparatus retrieves and analyzes the packets. Analysis results are used for detecting illegal content transmission and for blocking the spread of damage due to computer virus infection.

Figure 1:
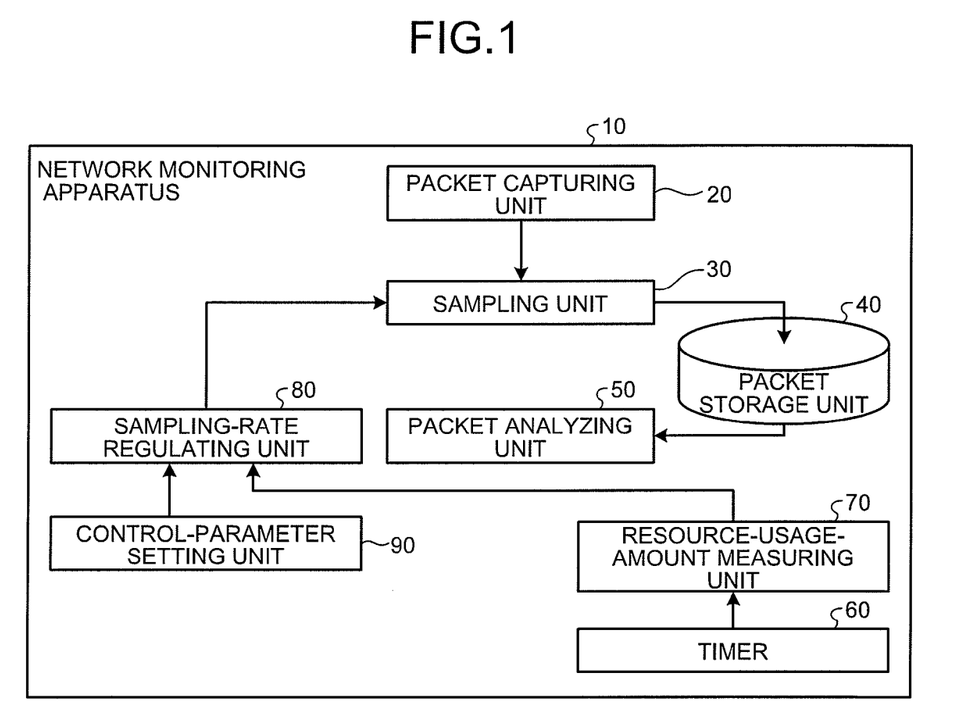
FIG. 1 is a block diagram of a network monitoring apparatus according to an embodiment of the present invention.

A functional structure of the network monitoring apparatus is explained further. FIG. 1 is a functional block diagram of the network monitoring apparatus according to a first embodiment of the present invention.

As shown in FIG. 1, a network monitoring apparatus 10 includes a packet capturing unit 20, a sampling unit 30, a packet storage unit 40, a packet analyzing unit 50, a timer 60, a resource-usage-amount measuring unit 70, a sampling-rate regulating unit 80, and a control-parameter setting unit 90.

Figure 2:
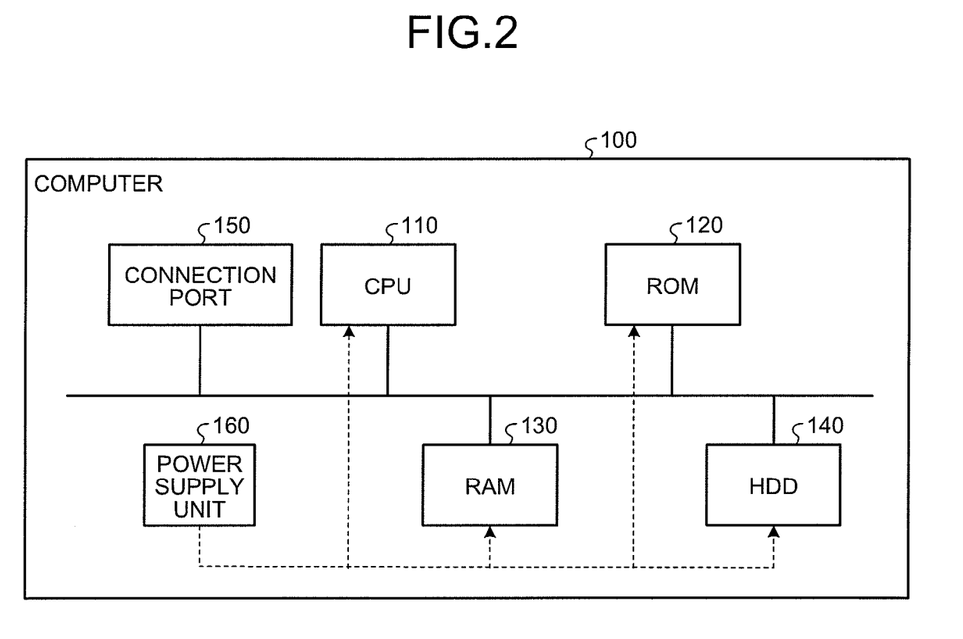
FIG. 2 is a schematic of a computer that is used as the network monitoring apparatus.

Actually, as shown in FIG. 2, the network monitoring apparatus 10 is realized by a computer 100 that includes a central processing unit (CPU) 110, a read-only memory (ROM) 120, a random access memory (RAM) 130, a hard disk drive (HDD) 140, a connection port 150, and a power supply unit 160.

In other words, computer programs executed by the CPU 110 realize functions of the packet capturing unit 20, the sampling unit 30, the packet analyzing unit 50, the sampling-rate regulating unit 80, the control-parameter setting unit 90, the resource-usage-amount measuring unit 70, and the timer 60. The HDD 140 or the RAM 130 corresponds to the packet storage unit 40.

Accordingly, by using the resources such as the CPU 110, the HDD 140, and the RAM 130, the network monitoring apparatus 10 realizes processes and functions of each unit explained further.

The packet capturing unit 20 receives the packets that flow on the distribution line and that are input to the network monitoring apparatus 10 itself, and outputs the packets to the sampling unit 30.

The sampling unit 30 determines, based on a specified sampling rate, whether to retrieve the packets, and stores the retrieved packets in the packet storage unit 40.

An example of a packet-retrieval determining method is explained further. When the sampling rate is 0.7, the sampling unit 30 first creates random numbers from 1 to 100. If the random numbers are from 1 to 70, the sampling unit 30 retrieves the packets and if the random numbers are from 71 to 100, the sampling unit 30 discards the packets.

The packet storage unit 40 stores the packets retrieved by the sampling unit 30.

The packet analyzing unit 50 reads the packets from the packet storage unit 40 and analyses the packets. The analysis results can be stored in the network monitoring apparatus 10 or can be transmitted to a predetermined control server etc.

The timer 60 outputs control signals to the resource-usage-amount measuring unit 70 in a fixed time interval.

The resource-usage-amount measuring unit 70 measures, in the fixed time interval, how many resources are actually used (a resource usage amount) by the network monitoring apparatus 10.

Specifically, upon receiving the control signals from the timer 60, the resource-usage-amount measuring unit 70 performs a resource-usage-amount measurement and outputs measured values to the sampling-rate regulating unit 80.

The resource-usage-amount measurement is performed for the CPU 110, the RAM 130, the HDD 140, and the power supply unit 160 that are shown in FIG. 2. For example, values of a usage ratio of the CPU 110, a data storage space in the RAM 130 or the HDD 140, a power supply amount of the power supply unit 160, etc. are the actual measured values.

When the packets flow in a large quantity on the path to be monitored and the network monitoring apparatus 10 retrieves and analyses all the packets, the values of the usage ratio of the CPU 110, the data storage space, the power supply amount, etc. gradually increase.

Based on measurement results by the resource-usage-amount measuring unit 70, the sampling-rate regulating unit 80 specifies the sampling rate for the sampling unit 30.

Specifically, when the measured values received from the resource-usage-amount measuring unit 70 are less than predetermined threshold values, the sampling-rate regulating unit 80 specifies the sampling rate for the sampling unit 30 as 100%. The predetermined threshold values are already set to the network monitoring apparatus 10.

On the other hand, when the measured values are greater than the predetermined threshold values, the sampling-rate regulating unit 80 updates the sampling rate such that the measured values to be received next time approach the predetermined target values.

The sampling-rate regulating unit 80 determines the sampling rate according to a proportional and integral (PI) control indicated in expressions (1) and (2).

$$e = \text{Target value} - \text{Measured value} \quad (1)$$

$$a = a[\text{previous}] + P \cdot (e - e[\text{previous}]) + I \cdot e \quad (2)$$

Whenever the measured values are received from the resource-usage-amount measuring unit 70, the sampling rate regulating unit 80 calculates e, simultaneously updates the sampling rate, and calculates a sampling rate a based on a currently calculated e or a previously calculated e. Further, the sampling-rate regulating unit 80 specifies the sampling rate for the sampling unit 30 as a.

Subsequently, because the sampling-rate regulating unit 80 receives the measured values in the same manner, the sampling-rate regulating unit 80 again calculates e, calculates the sampling rate a based on the currently calculated e or the previously calculated e, and specifies the sampling rate for the sampling unit 30 as a.

Thus, because the sampling-rate regulating unit 80 updates the sampling rate again, the measured values are converged near the target values.

When the packets flow in a small quantity on the path to be monitored, the measured values are less than the predetermined threshold values. Therefore, the sampling-rate regulating unit 80 does not update the sampling rate.

The target value, P, and I in expressions (1) and (2) are control parameters and at the time of power activation, the control-parameter setting unit 90 sets the control parameters for the sampling-rate regulating unit 80.

Although the target values are optional, it is desirable to determine optimum values of P and I for the target values by using a method explained below.

In other words, a parameter domain of P and I which provides a stable control is determined by using a mathematical expression model that expresses a relation between a sampling rate control and the resource usage amount that is obtained as a control result.

The mathematical expression model is derived by formulating the sampling rate that is updated in synchronization with the resource-usage-amount measurement and a variation in the resource usage amount that is consequently obtained.

The resource usage amount when all the packets arrived within a resource-usage measurement interval are processed is assumed as E, and the resource usage amount that is released from the process within the resource-usage measurement interval and that can be used is assumed as C. Moreover, within the resource-usage measurement interval, the packets are retrieved by using a fixed sampling rate a. Consequently, expression (3) is obtained that indicates a resource usage amount ρ at the time of next measurement.

$$\rho = \rho + a \cdot E - C \qquad (3)$$

The PI control in expressions (1) and (2), and the variation of the resource usage amount in expression (3) are analyzed as a discrete-time feedback-control mechanism that assumes the resource-usage measurement interval as a unit time.

Figure 3:
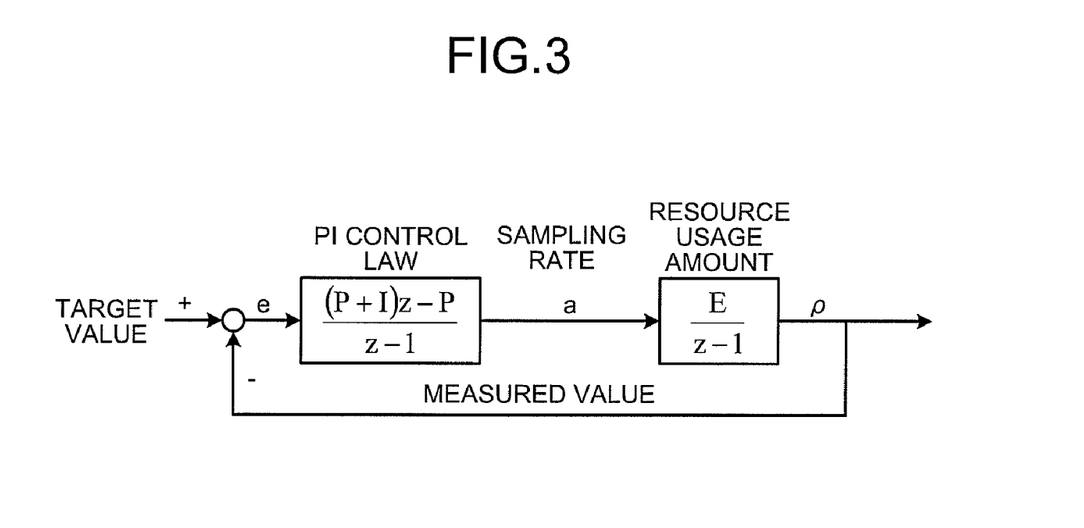
FIG. 3 is a block diagram of a feedback control mechanism.

FIG. 3 is a block diagram of a constructed feedback control mechanism and a discrete-time closed-loop transfer function at that time is as explained by using expression (4).

$$G(z) = \frac{E(P+I)z - EP}{z^2 + \{E(P+I) - 2\}z + \{1 - EP\}} \qquad (4)$$

Consequently, the control parameters P and I that stabilize a closed-loop system are derived as expression (5) by Jury's stability test.

$$\begin{cases} 0 < P < 2/E \\ 0 < I < -2P + 4/E \end{cases} \qquad (5)$$

Figure 4:
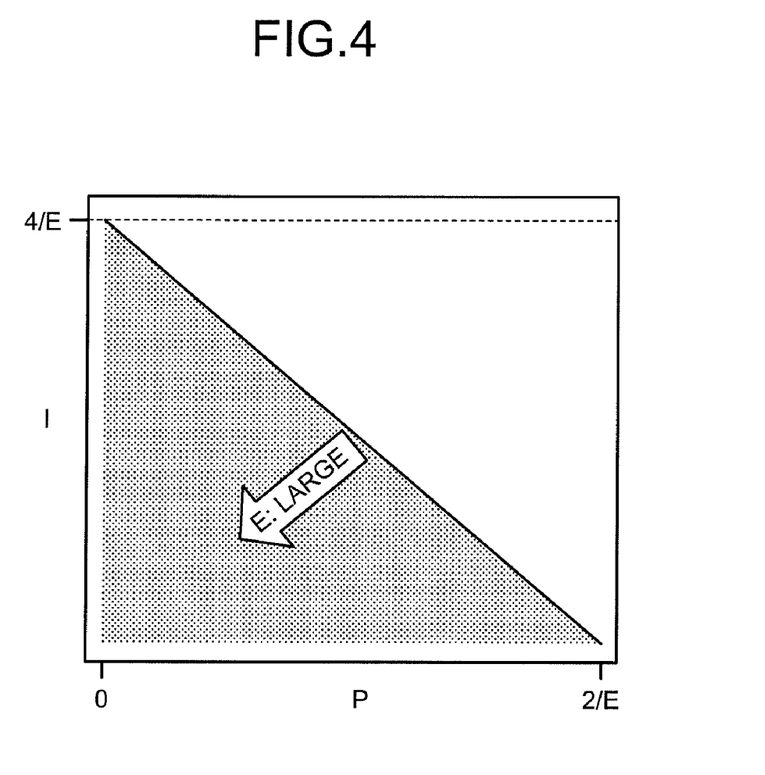
FIG. 4 illustrates a parameter stability domain of the feedback control mechanism.

In other words, in expression (5), if the parameters inside a stability domain shown in FIG. 4 are used, a stable sampling-rate control having an assured convergence towards the target values can be provided.

Although a process from determining E up to selecting the parameters is concretely explained below, a percentage for a total resource amount is used as a unit of the resource usage amount. Even if the unit changes, only a parameter scale changes independent of the above mathematical expression model or description below.

The stability domain shown in FIG. 4 depends on the resource usage amount E when all the packets arrived within the resource-usage measurement interval are processed. Specifically, the stability domain decreases as E increases.

Further, E depends on the resource-usage measurement interval. Specifically, the value of E increases as the measurement time increases.

Because determination of the resource-usage measurement interval is optional, it is desirable to estimate a maximum number of the packets that can be generated in the measurement interval along with estimating the resource usage amount and determining the value of E on a safe side.

For example, if the resource-usage measurement interval is assumed as one second and if there exists a CPU in which the usage ratio is not more than or equal to 100% (for example, 90%) even though it is assumed that the maximum number of the packets that can be generated in one second are analyzed, the value of E is assumed as 100. Further, the measurement interval determined at that time becomes a time interval of the timer 60.

Subsequently, a parameter selection is carried out. For example, when the sampling rate control is executed assuming the CPU usage ratio as the measured value, variations in the CPU usage ratio when the parameters (P=0.005, I=0.0005) inside the stability domain are indicated in FIG. 5A and variations in the CPU usage ratio when the parameters (P=0.02, I=0.03) outside the stability domain are used upon assuming E as 100 are indicated in FIG. 5B.

Figure 5A:
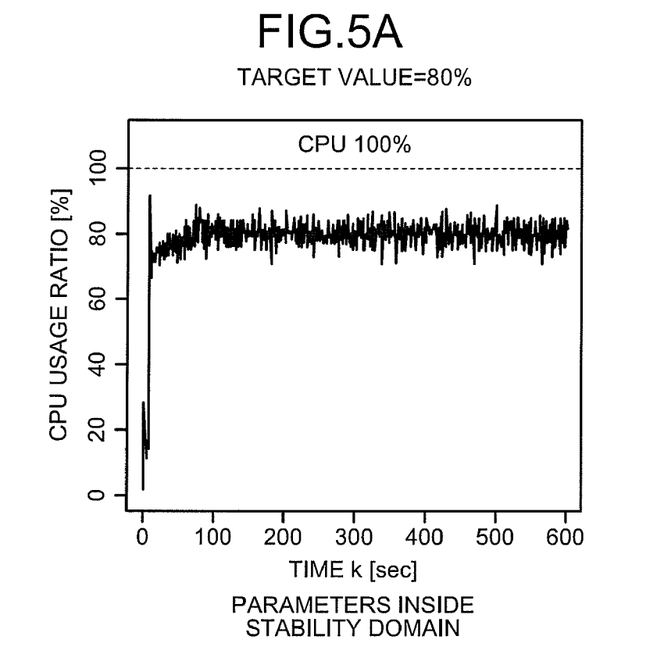
FIGS. 5A and 5B illustrate evaluation results when parameters inside and outside a stability domain are used.
Figure 5B:
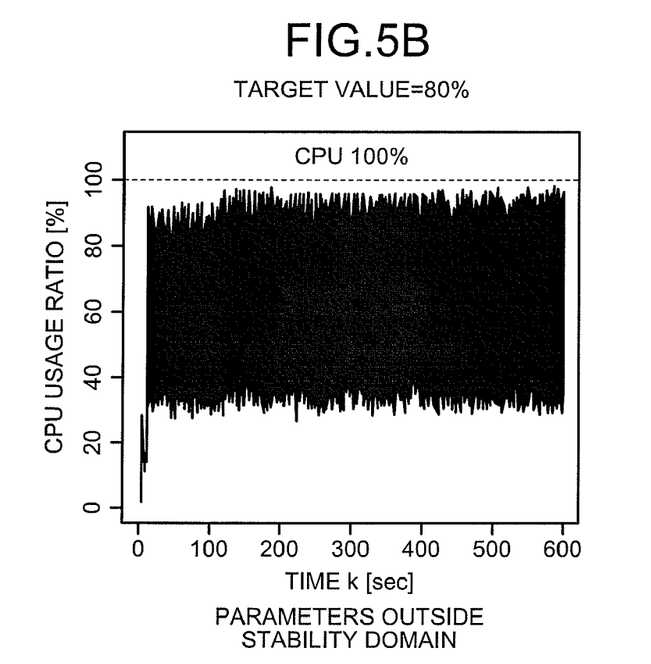

As shown in FIGS. 5A and 5B, when the parameters outside the stability domain are used, the CPU usage ratio cannot converge to the target value.

Therefore, it is desirable to select the parameters from inside the stability domain shown in FIG. 4. However, a difference in tracking performance with the same target value when two different parameters A and B inside the stability domain are used is indicated in FIGS. 6A and 6B.

Figure 6A:
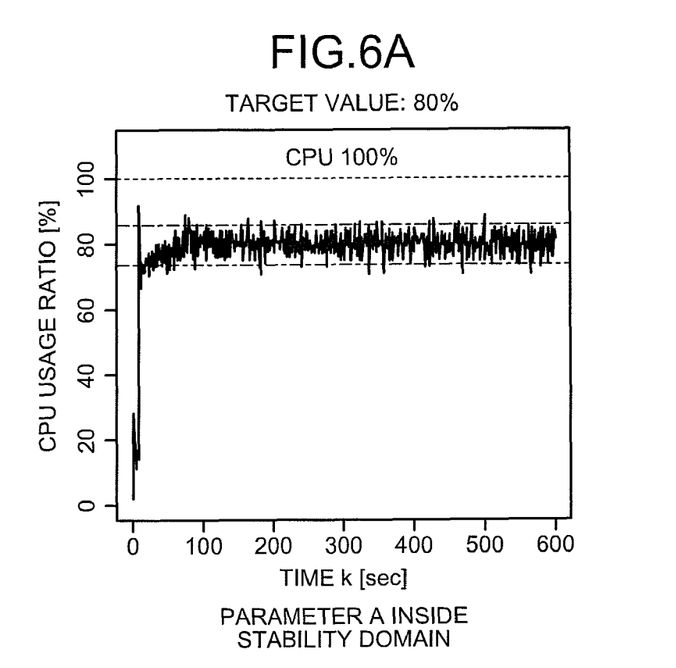
FIGS. 6A and 6B illustrate tracking evaluation results.
Figure 6B:
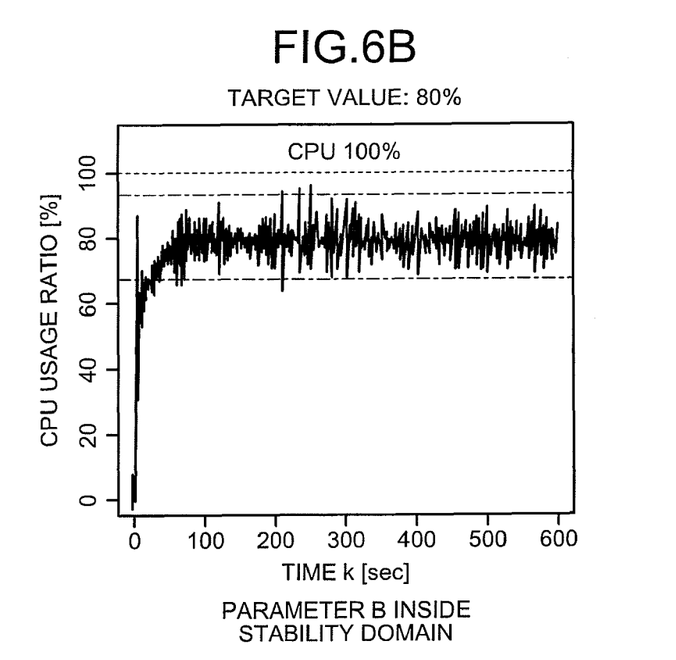
Figure 7A:
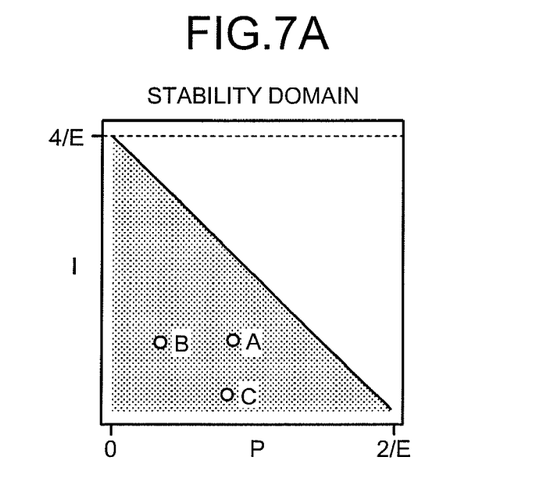
FIGS. 7A to 7D show an example of a tracking evaluation simulation.
Figure 7B:
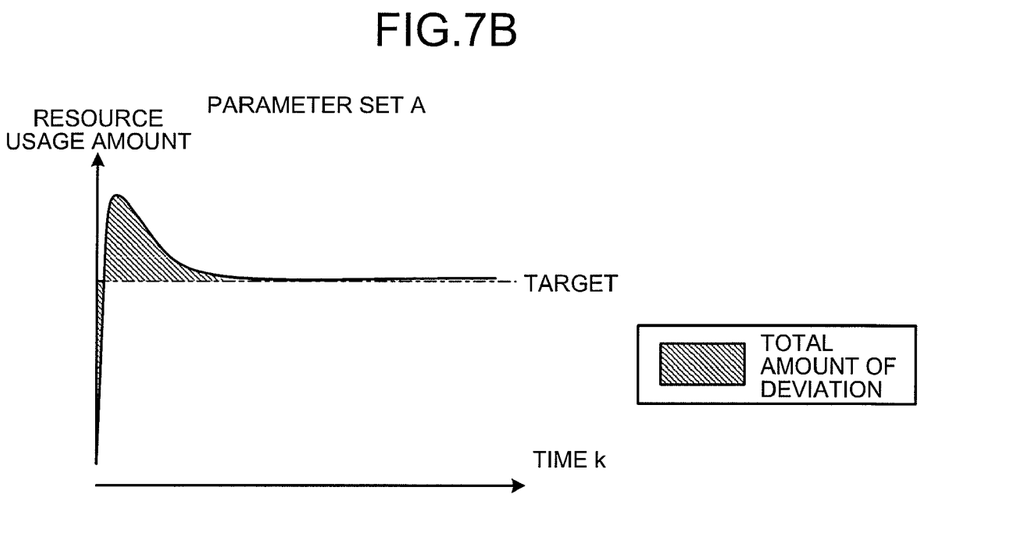
Figure 7C:
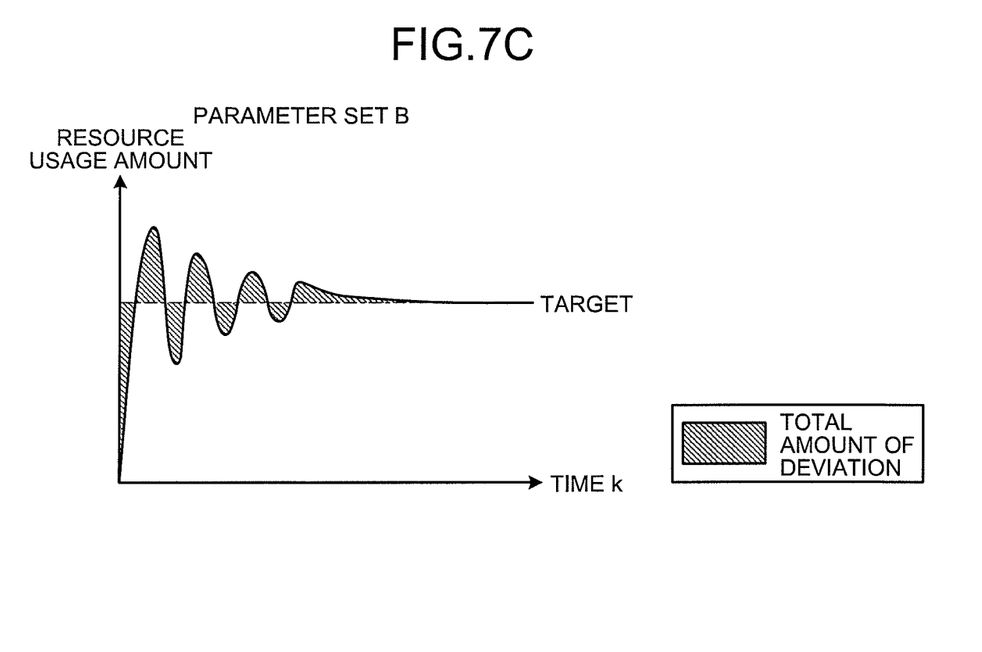
Figure 7D:
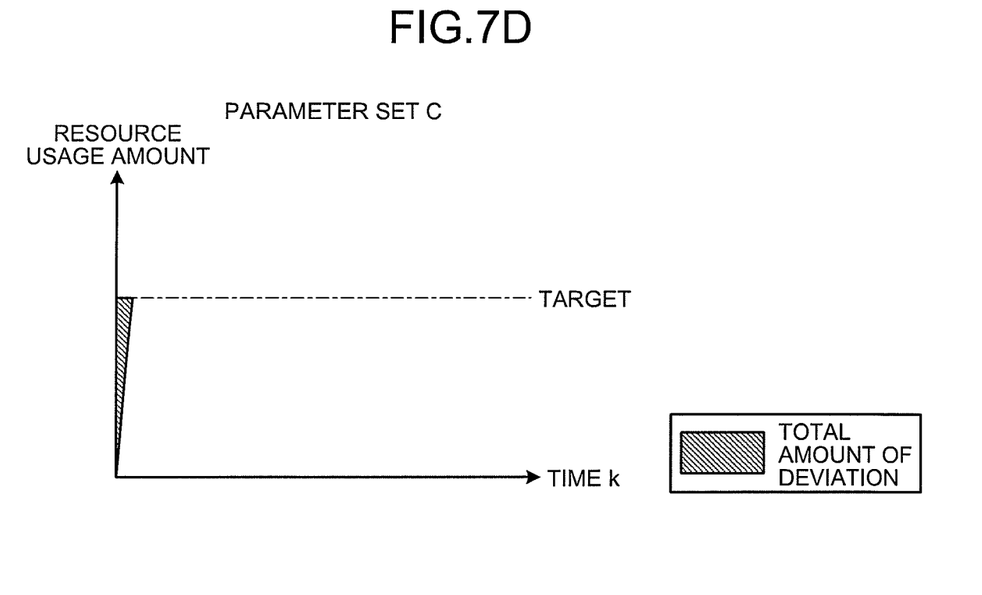

As shown in FIGS. 6A and 6B, although the two parameters are from inside the stability domain, both the parameters perform differently when complying with the target value.

It is desirable to carry out a simulation for uniquely determining optimum parameters from the parameters inside the stability domain shown in FIG. 4.

Specifically, a parameter set (P, I) inside the stability domain is randomly arranged and the parameters having a maximum tracking performance for the target value are selected as the optimum parameters.

To evaluate the tracking performance, a fixed value (a fixed value greater than the target value) is assigned for E and a fixed value (minimum) is assigned for C that are given in expression (3), and an overload condition is simulated. Moreover, a concrete numeric value is assigned also for the target value.

Further, a variation in signals obtained from finite-time simulations of expressions (1), (2), and (3) is monitored and the parameters from the parameter set (P, I) having a least total errors from the target value within a simulation time are selected as the optimum parameters.

A calculation example of a tracking evaluation simulation is indicated below. Time is assumed as k (k is less than n) and a following simulation is carried out for a specific parameter set (P, I) within the stability domain.

```
sum = 0; /* total errors from the target value */
E = 100;
C = 10;
For (k=1; k<n; k++) /* k is looped till time n */
{
    e[k] = (target value) − ρ[k]
    a[k] = a[k−1] + P·(e[k] − e[k−1]) + I·e[k]
    ρ[k+1] = ρ[k] + a[k]·E − C
    sum = sum + (absolute value of e[k])
}
```

A total sum of the errors from the target value is compared for each parameter set and the parameter set having a least value of the total sum of the errors is selected.

FIGS. 7A to 7D illustrate a tracking-evaluation simulation image. As seen from FIGS. 7A to 7D, it is desirable to select a parameter set C that immediately complies with the target value.

The control-parameter setting unit 90 sets the thus-determined target value, P, and I to the sampling-rate regulating unit 80.

Figure 8:
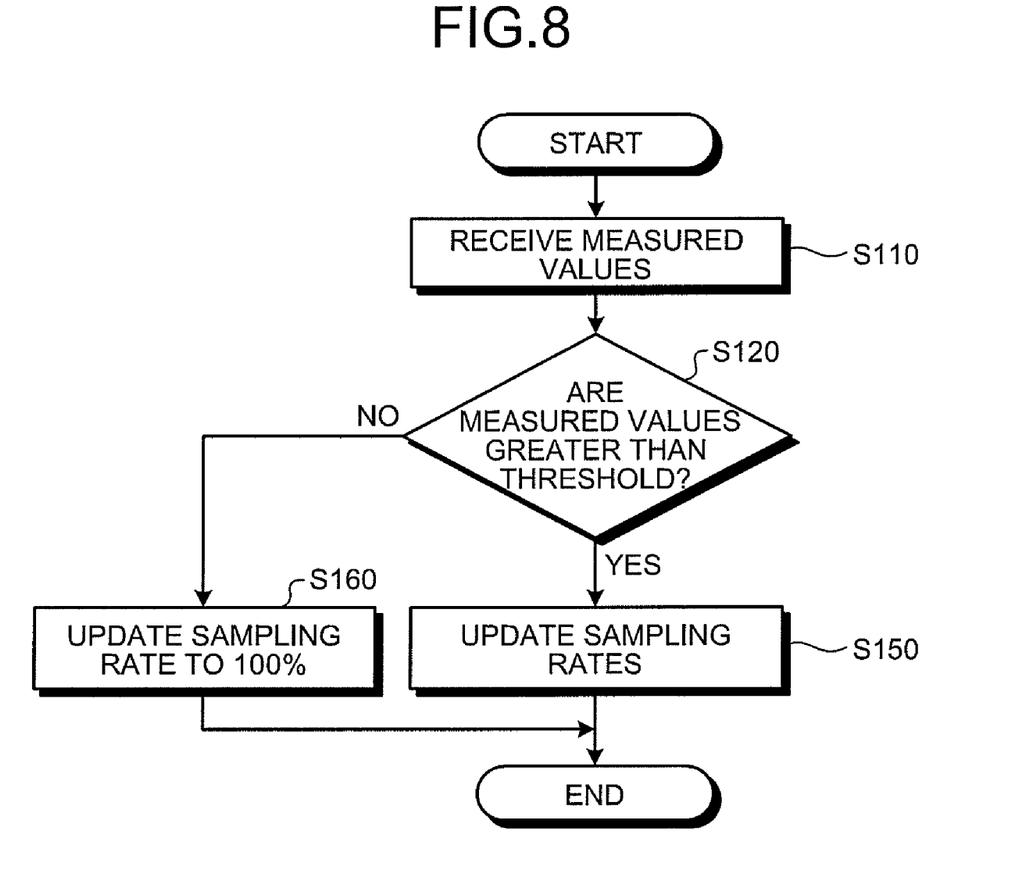
FIG. 8 is a flowchart of processes performed by a sampling-rate regulating unit.

At the end, process operations performed by the sampling-rate regulating unit 80 are explained with reference to a flowchart shown in FIG. 8. A process flow shown in FIG. 8 is executed whenever the measured values are output from the resource-usage-amount measuring unit 70.

The sampling-rate regulating unit 80 receives the measured values from the resource-usage-amount measuring unit 70 (step S110).

If the measured values are greater than the predetermined threshold values (Yes at step S120), the sampling-rate regulating unit 80 updates the sampling rates for the sampling unit 30 (step S150) and ends the process.

If the measured values are still greater than the predetermined threshold values (Yes at step S120), updating the sampling rate for the sampling unit 30 is continued (step S150).

On the other hand, if the measured values are less than the predetermined threshold values (No at step S120), the sampling-rate regulating unit 80 updates the sampling rate for the sampling unit 30 to 100% (step S160) and ends the process.

According to the first embodiment described above, the network monitoring apparatus measures the resource usage amount in the network monitoring apparatus itself and dynamically regulates, based on the measurement results, the sampling rate for the packets. Specifically, if the value of the resource usage amount is less than the threshold value, the sampling rate is set to 100% and all the packets are retrieved. If the value of the resource usage amount is greater than the threshold value, the sampling rate is regulated such that the value of the resource usage amount approaches the predetermined value. Due to this, the resources inside the network monitoring apparatus can be maximally utilized within a usable range.

Although the network monitoring apparatus according to the first embodiment is explained as described above, the present invention can be executed using various embodiments other than the first embodiment. Different embodiments are classified as (1) to (3) and explained below.

(1) In the first embodiment according to the present invention, a computer that executes computer programs is used as the network monitoring apparatus. However, the present invention is not to be thus limited. A dedicated network monitoring apparatus can be used that implements processes of each functional unit using hardware logic.

(2) In the first embodiment according to the present invention, the distribution line branches from the main line. However, the present invention is not to be thus limited. Any method can be used if the packets flowing on the path to be monitored can be retrieved. For example, a data relay device such as a router that is directly connected to the main line can also be used as the network monitoring apparatus and the packets input to the data relay device can be mirrored.

(3) In the first embodiment according to the present invention, all the packets flowing on the main line are flown on the distribution line, which branches from the main line, and input to the network monitoring apparatus. However, the present invention is not to be thus limited. A branching unit can function as part of the network monitoring apparatus and carry out sampling.

In other words, the packet capturing unit 20 and the sampling unit 30 correspond to the branching units, and if the sampling rate reduces, some of the packets flowing on the main line can be flown on the distribution line and the packets can be input to the network monitoring apparatus that excludes the two functional units such as the packet capturing unit 20 and the sampling unit 30.

Because sampling rates are dynamically regulated based on a resource status inside a network monitoring apparatus, the resources inside the apparatus are not overused or underused, however, the resources can be maximally used within a usable range. Due to this, a system process is not delayed and unnecessary deterioration of accuracy of analysis results due to execution of an inefficient thinning process despite of sufficient resources is avoided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer program product having a non-transitory computer readable medium including programmed instructions executed by a network monitoring apparatus, the instructions comprising:
   retrieving packets flowing on a path to be monitored on a network;
   analyzing the packets retrieved at the retrieving;
   measuring a usage amount of resources that are actually used by the network monitoring apparatus; and
   regulating, upon measurement results at the measuring exceeding predetermined threshold values, a sampling rate indicating a percentage of the packets on the path that are analyzed at the analyzing such that the measurement results at the measuring approach predetermined target values, wherein
   the sampling rate is set, upon the measurement results at the measuring not exceeding the predetermined threshold values, to 100% at the regulating.

2. The computer program product according to claim 1, wherein the measuring is performed for each fixed time interval, and
   the sampling rate is calculated and set, upon exceeding the predetermined threshold values, at the regulating, every time the measuring is performed, by a PI control based on a difference between the measurement results and predetermined target values, such that next measurement results approach the predetermined target values.

3. The computer program product according to claim 2, wherein parameters of the PI control used at the measuring are optimum values calculated by a simulation carried out by using a mathematical expression model that assumes the parameters as variables.

4. The computer program product according to claim 1, wherein the measurement results obtained at the measuring indicate a usage ratio of a central processing unit, or a data storage space of a memory or a hard disk drive, or power consumption.

5. A method for monitoring a network in a network monitoring apparatus connected the network, comprising:
   retrieving packets flowing on a path to be monitored on the network;
   analyzing the packets retrieved at the retrieving;
   measuring a usage amount of resources that are actually used by the network monitoring apparatus; and
   regulating, upon measurement results at the measuring exceeding predetermined threshold values, a sampling rate indicating a percentage of the packets on the path that are analyzed at the analyzing such that the measurement results at the measuring approach predetermined target values, wherein
   the sampling rate is set, upon the measurement results at the measuring not exceeding the predetermined threshold values, to 100% at the regulating.

6. A network monitoring apparatus, comprising:
   a packet retrieving unit that retrieves packets flowing on a path to be monitored on a network;
   a packet analyzing unit that analyzes the packets retrieved by the packet retrieving unit;
   a resource-usage-amount measuring unit that measures a usage amount of resources that are actually used by the network monitoring apparatus; and
   a sampling-rate regulating unit that regulates, upon measurement results measured by the resource-usage-amount measuring unit exceeding predetermined threshold values, a sampling rate indicating a percentage of the packets on the path that are analyzed by the packet analyzing unit such that the measurement results by the resource-usage-amount measuring unit approach predetermined target values and that sets, upon the measurement results measured by the resource-usage-amount measuring unit not exceeding the predetermined threshold values, the sampling rate to 100%.

* * * * *